United States Patent [19]

Carlson

[11] Patent Number: 4,933,016

[45] Date of Patent: Jun. 12, 1990

[54] CAR WASH

[76] Inventor: Mark Carlson, P.O. Box 307, Siloam Springs, Ark. 72761

[21] Appl. No.: 298,421

[22] Filed: Jan. 18, 1989

[51] Int. Cl.$^5$ .............................................. B08B 3/02
[52] U.S. Cl. .................................. 134/18; 134/57 R; 134/45; 134/181; 239/751
[58] Field of Search .............. 134/56 R, 58 R, 45, 134/123, 172, 174, 180, 181, 18, 24; 239/751, 750

[56] References Cited

U.S. PATENT DOCUMENTS

| | | | |
|---|---|---|---|
| 3,167,797 | 2/1965 | Hergonson | 134/123 X |
| 3,299,901 | 1/1967 | Axe et al. | |
| 3,421,526 | 1/1969 | Alkire et al. | 134/123 X |
| 3,422,827 | 1/1969 | McCulloch | |
| 3,474,801 | 10/1969 | Stotts | 134/123 |
| 3,529,611 | 9/1970 | Daum et al. | |
| 3,533,422 | 10/1970 | Alimanestiano | 134/57 R |
| 3,543,774 | 12/1970 | Trasp | 134/123 X |
| 3,604,434 | 9/1971 | Hurst | 134/123 X |
| 3,736,948 | 6/1973 | Crosswhite | 134/123 X |
| 3,844,480 | 10/1974 | Taylor et al. | |

Primary Examiner—Frankie L. Stinson

Attorney, Agent, or Firm—Boyd D. Cox

[57] ABSTRACT

An automatic high pressure, frictionless, water and chemical vehicle washing device is self-contained and has a light weight aluminum frame which can be attached to a floor by adjustable leg supports or suspended from a ceiling, allowing it to be installed easily and quickly into any self-service or automatic car wash bay. The device is powered by relatively low air pressure and the spray washing head is movable in perpendicular directions allowing the spray head to seek any possible location within the boundaries of the machine itself. Photo-electric infra-red beams sense the presence of the vehicle being washed; relay signals to a programmable controller, and direct the spray head to seek the dimensions of various sized vehicles. Once the vehicle dimensions are established via communication between the photo-eye and the programmable controller, the machine maintains a safe but effective washing distance between the spray head and the vehicle surface of approximately fourteen inches. A mechanism is provided for indexing the spray head which causes it to rotate precisely ninety degrees at each corner of the vehicle and then lock in place by the force of a single small hydraulic cylinder activated brake.

20 Claims, 15 Drawing Sheets

CAR WASH

BACKGROUND OF THE INVENTION

1. Field of the Invention

The present invention relates to car washing devices, and more particularly pertains to an improved car wash for automatically washing the outer surfaces of a vehicle by applying chemicals, waxes and both hot and cold water on the vehicle without any part of the device making contact with the vehicle surfaces, thus eliminating any paint scratches, broken mirrors, antennas, etc., caused by conventional contact type brush washing systems. By utilizing road-film breaking chemicals and high pressure detergent cleaning action, virtuallY all dirty surfaces of a vehicle are cleaned, leaving no uncleaned nooks or crannies. The conventional forms of car washes are of two types. In a first type, the vehicle is driven through a fixed track and a combination of spray heads and brushes wash the vehicle surface. In a second type of conventional car wash, a spray arm is mounted in a fixed track for movement around a vehicle. These conventional devices are disadvantageous because contact is required with the vehicle surface, and with the case of the fixed track movable spray head, the path of the head is not adaptable to various different sizes of vehicles. These prior art devices also require the use of electric motors in the washing area, which creates the potential for electrocution of individuals, as well as resulting in motor failure due to constant exposure to spray, steam, fog and chemicals. In order to overcome these problem, the present invention provides a non-contacting adjustable path spray system for adapting the path of a movable spray head to various different vehicle sizes.

2. Description of the Prior Art

Various types of car washing devices are known in the prior art. A typical example of such car washing device is to be found in U.S. Pat. 3,299,901, which issued to D. Axe et al on Jan. 24, 1967. This patent discloses a car wash having an L-shaped spray head supported for movement in a fixed overhead track. A handle is utilized to manually move the spray head which is supported on a pivotal cantilever arm. While the spray head is movable in perpendicular directions, it requires manual manipulation to adjust the spray head path to the configuration of the vehicle. Additionally, the L-shaped spray head must be manually indexed through a ninety degree increment at each corner of the vehicle. U.S. Pat. 3,422,827, which issued to D. McCulloch on Jan. 21, 1969, discloses a car washing device which includes an L-shaped spray head mounted for movement about a fixed rectangular track. Thus, the device is not capable of adjusting the movement path of the spray head to adapt to various different sizes of vehicles. U.S. Pat. 3,529,611, which issued to J. Daum et al on Sept. 22, 1970, discloses a car washing device which includes an L-shaped spray head having a plurality of rotatable spray nozzles spaced therealong The device lacks provisions for automatically adjusting the movement path of the spray head depending upon the dimensions of the particular vehicle being washed. U.S. Pat. 3,844,480, which issued to J. Taylor et al on Oct. 29, 1974, discloses a car washing device which includes an overhead spray head mounted for reciprocal movement in a fixed track. The spray head includes a horizontal carrier having a plurality of horizontally spaced nozzles which can be swiveled to direct the nozzle spray. At each end of travel, the horizontal carrier moves vertically up and down to wash the front and back of the vehicle.

While the above mentioned devices are directed to the same general field as the instant invention, none of these devices disclose a car wash capable of automatically adjusting the movement path of a spray head around various different sizes of vehicles, while maintaining a constant separation between the vehicle surface and the spraY head. Additionally, none of these devices disclose a car wash having a spray head mounted for movement in perpendicular directions by rodless air cylinders. Additional features of the present invention, not contemplated by the aforesaid prior art devices, include the provision of a programmable controller and a photo-electric system for measuring the dimensions of a particular vehicle and controlling the path of movement of the wash spray head. Inasmuch as the art is relatively crowded with respect to these various types of car washing devices, it can be appreciated that there is a continuing need for and interest in improvements to such car washing devices, and in this respect, the present invention addresses this need and interest.

SUMMARY OF THE INVENTION

In view of the foregoing disadvantages inherent in the known types of car washing devices now present in the prior art, the present invention provides an improved car wash. As such, the general purpose of the present invention, which will be described subsequently in greater detail, is to provide a new and improved car wash which has all the advantages of the prior art car washing devices and none of the disadvantages.

To attain this, a representative embodiment of the concepts of the present invention is illustrated in the drawings and makes use of an automatic high pressure, frictionless, water and chemical vehicle washing device which is self-contained and has a light weight aluminum frame which can be attached to a floor by adjustable leg supports or suspended from a ceiling, allowing it to be installed easily and quickly into any self-service or automatic car wash bay. The device is powered by relatively low air pressure and the spray washing head is movable in perpendicular directions allowing the spray head to seek any possible location within the boundaries of the machine itself. Photo-electric infra-red beams sense the presence of the vehicle being washed; relay signals to a programmable controller, and direct the spray head to seek the dimensions of various sized vehicles. Once the vehicle dimensions are established via communication between the photo-eye and the programmable controller, the machine maintains a safe but effective washing distance between the spray head and the vehicle surface of approximately fourteen inches. A novel turning mechanism is provided for indexing the spray head which causes it to turn precisely ninety degrees at each corner of the vehicle and then lock in place by the force of a single small hydraulic cylinder activated brake.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved car wash which has all the advantages of the prior art car washing devices and none of the disadvantages.

It is another object of the present invention to provide a new and improved car wash which may be easily and efficiently manufactured and marketed.

It is a further object of the present invention to provide a new and improved car wash which is of a durable and reliable construction.

An even further object of the present invention is to provide a new and improved car wash which is susceptible of a low cost of manufacture with regard to both materials and labor, and which accordingly is then susceptible of low prices of sale to the consuming public, thereby making such car washing devices economically available to the buying public.

Still yet another object of the present invention is to provide a new and improved car wash which provides in the apparatuses and methods of the prior art some of the advantages thereof, while simultaneously overcoming some of the disadvantages normally associated therewith.

Still another object of the present invention is to provide a new and improved car wash which is operative to control the movement of a spray head in accordance with the measured dimensions of a particular vehicle being washed.

Yet another object of the present invention is to provide a new and improved car wash which utilizes a spray head mounted for movement in perpendicular directions by rodless air cylinders.

Even still another object of the present invention is to provide a new and improved car wash utilizing an L-shaped spray head which is automatically indexed through ninety degrees at each corner of a vehicle being washed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
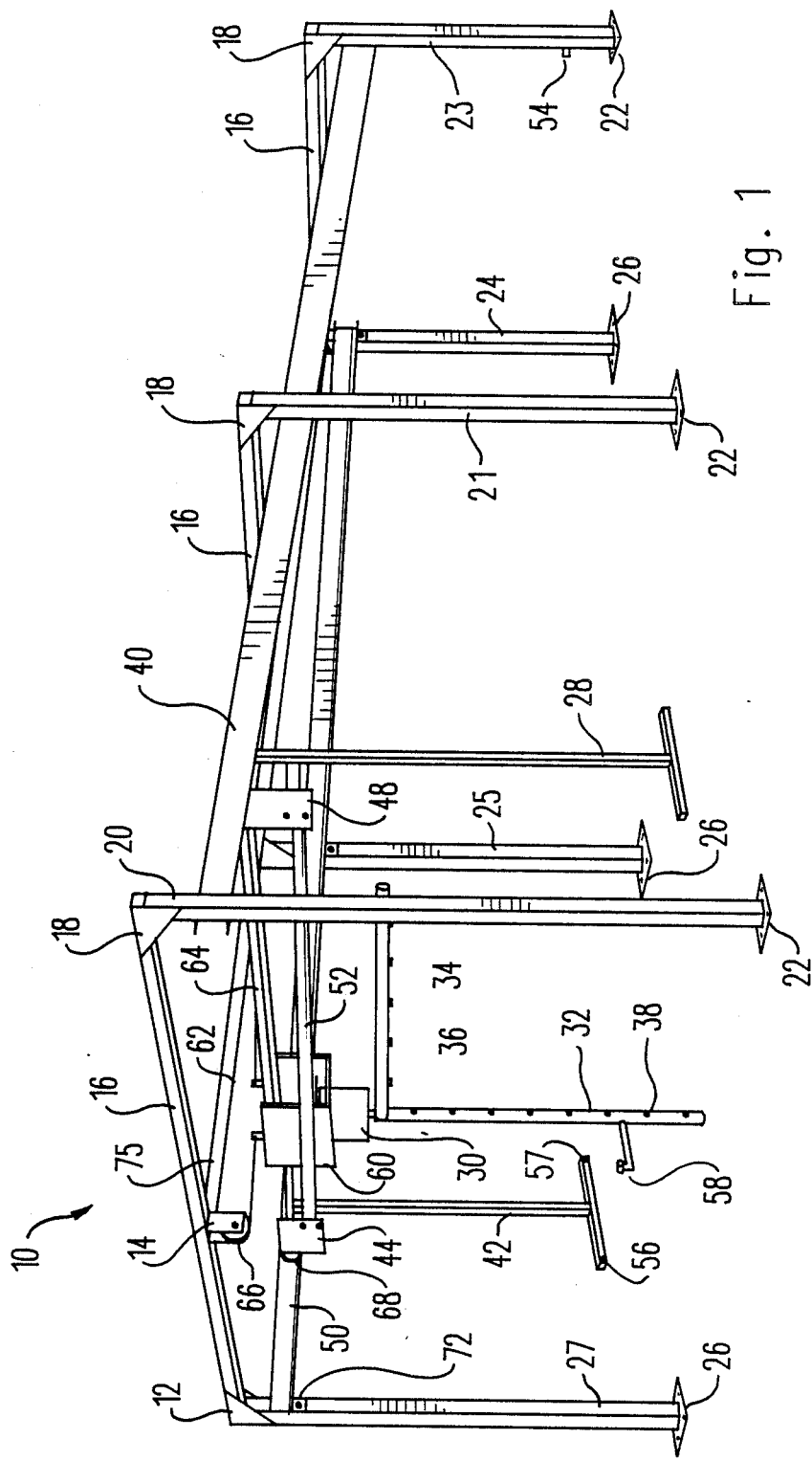
FIG. 1 is a perspective view illustrating the car wash of the present invention.

With reference now to the drawings, and in particular to FIG. 1 thereof, a new and improved car wash embodying the principles and concepts of the present invention and generally designated by the reference numeral 10 will be described.

More specifically, it will be noted that the first embodiment 10 of the invention includes a plurality of vertical posts 20, 21, 23, 24, 25, and 27 connected by a plurality of spaced transverse beams 16. A pair of corner support braces 12 and 18 secure opposite ends of each of the beams 16 between respective spaced vertical posts. A pair of parallel spaced longitudinal guide rails 40 and 50 are secured to the spaced vertical posts by a plurality of brackets 72. A longitudinally movable carriage assembly, having frame portions 44 and 48, includes rollers 68 supported for longitudinal reciprocal movement along the guide rails 40 and 50. A transversely movable trolley assembly 60 is mounted for reciprocal movement between the carriage frame members 44 and 48. An L-shaped spray arm has a horizontal portion 34 with a plurality of nozzles 36 for washing top surfaces of a vehicle and a vertical portion 32 is provided with a plurality of nozzles 38 for washing side surfaces of a vehicle. The L-shaped spray arm extends from a housing 30 secured for movement with the trolley 60. An indexing mechanism within the trolley housing 60 is operative to rotated the spray head 32, 34 about a vertical axis with respect to the housing 30, in ninety degree angular increments. The trolley 60 includes a roller assembly guided for transverse movement on a transverse guide rail 64. The carriage assembly includes a transverse support beam 52. A pneumatic cable cylinder 75 extends longitudinally and is supported by the transverse beams 16. A cable 62 of the cylinder 75 has opposite ends secured to the trolley housing 60. A bracket 14 mounts one end of the cylinder 75 and supports pulley 66. The cylinder 75 is of the type which replaces the usual piston rod with a cable. This allows an extremely long range of travel. The cylinder 75 is preferably of the type disclosed by U.S. Pat. 4,694,733, the entire disclosure of which is herein incorporated by reference. A similarly constructed pneumatic cylinder is utilized to effect transverse movement of the trolley 60 along the guide rail 64, in a manner to be subsequently illustrated and described. A pair of elongated sensor support arms 28 and 42 are mounted at opposite sides of the longitudinally movable carriage assembly for longitudinal movement therewith. Each of the support arms 28 and 42 includes a transverse terminal portion mounting spaced photo-electric sensor elements 56 and 57. Photo-electric sending elements are mounted on one of the arms, for example 42 and receiving elements are mounted on the opposite arm, for example 28. A similar photo-electric element 58 is mounted on a transverse arm extending from the vertical portion 32 of the L-shaped spray head. A cooperating photo-electric element 54 is secured to the vertical post 23. The various photo-electric elements 54, 56, 57 and 58 are preferably of the infra-red type. A plurality of adjustable floor support plates 22 and 26 are utilized to secure the bottom ends of each of the vertical support legs to the floor surface at an intended installation site.

Figure 2:
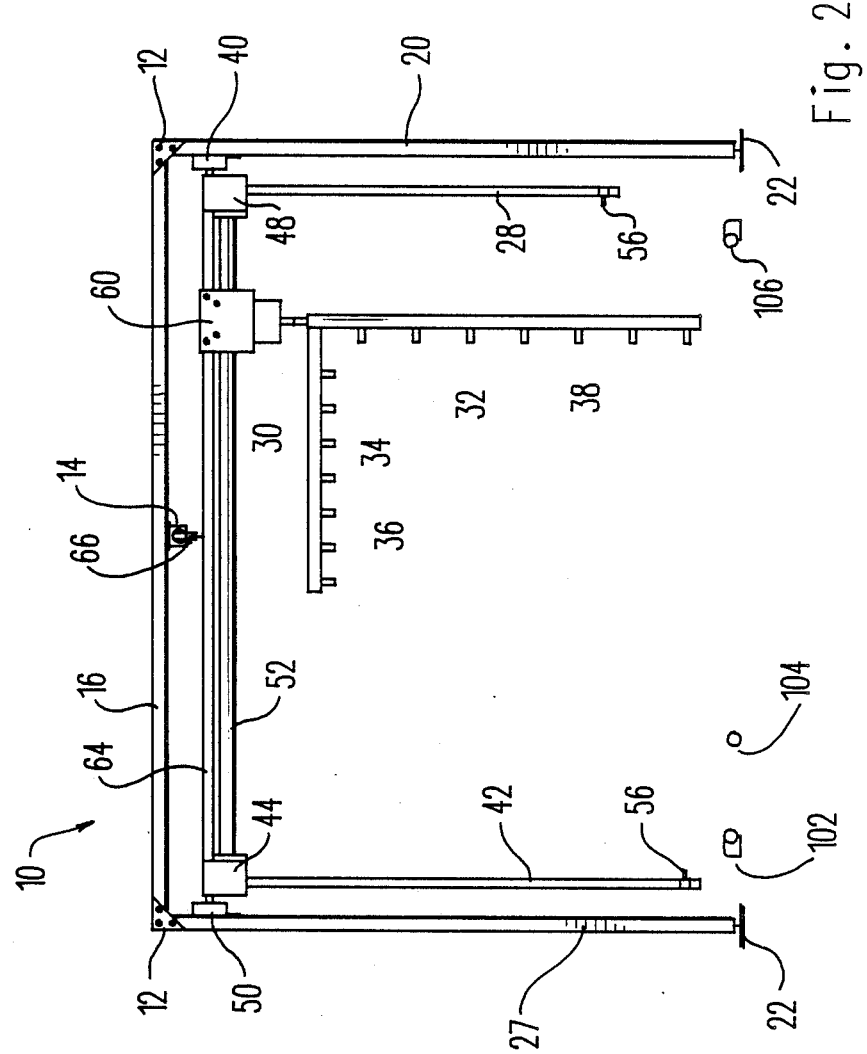
FIG. 2 is an end view illustrating the car wash.

FIG. 2 illustrates an end view of the car wash. A plurality of parallel spaced floor mounted guide rails 102, 104, and 106 may be provided to align entering vehicles within the spaced vertical posts 20 and 27. The sensor supporting arms 28 and 42 may be formed with different lengths, as illustrated. The sensor transmitting elements 56, 57 on one of the arms are then suitably angled to impinge on the cooperating elements on the opposite arm. This allows detection of vehicles having varying ground clearances. Alternatively, the arms 28 and 42 may be formed with the same length, with the sensor elements 56 disposed in horizontal alignment.

Figure 3:
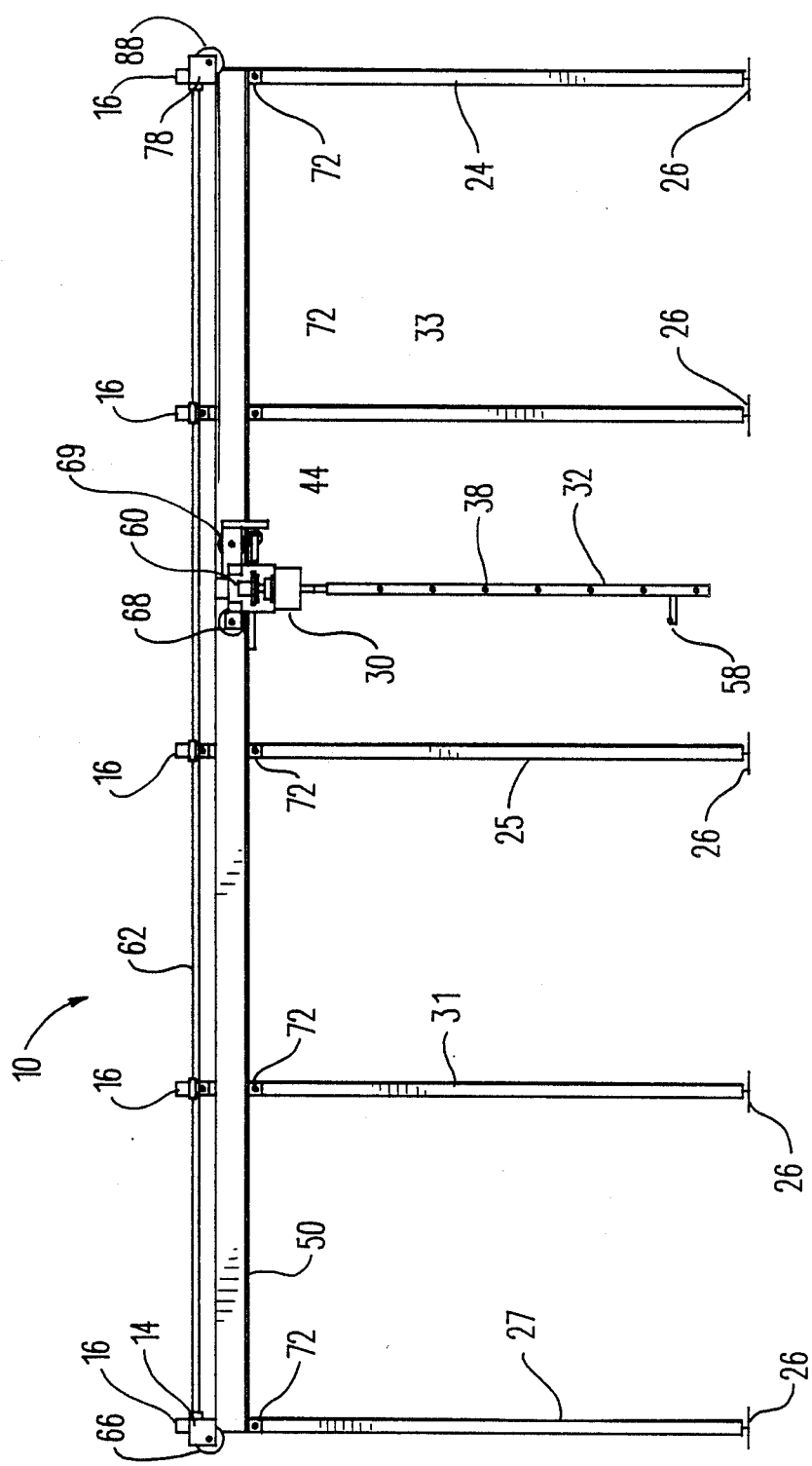
FIG. 3 is a side view illustrating the car wash.

FIG. 3 illustrates a side view of the car wash 10 of the present invention. One row of the vertical posts and the guide rail 40 have been removed to illustrate the rollers 68 and 69 supporting the carriage assembly 44 for longitudinal movement in the guide channel 50.

Figure 4:
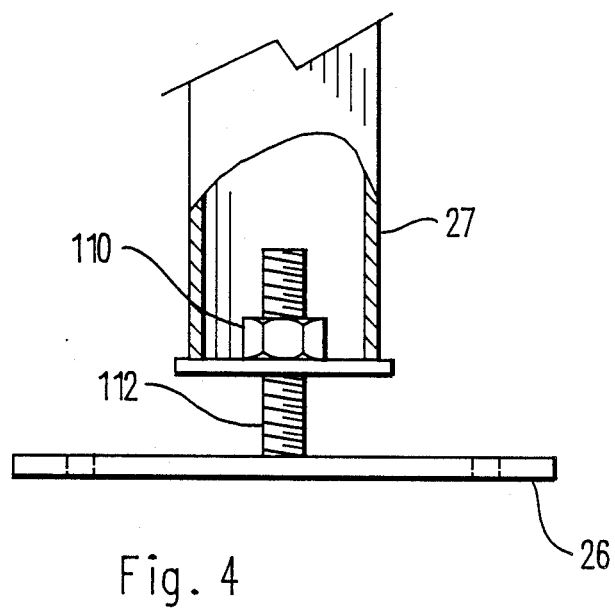
FIG. 4 is a detail view, partially cut away, illustrating the adjustable supporting foot of the vertical car wash frame posts.

FIG. 4 is a detail view, illustrating the floor supporting plate 26 on the bottom end of one of the vertical post 27. The floor support plate 26 includes a plurality of apertures designed to receive conventional threaded fasteners to secure the plate 26 to a floor surface at an intended mounting location. The floor support plate 26 includes a threaded rod 112 secured to the bottom end of post 27 by a nut 110, which may be secured in place by welding. Suitable locking nuts and washers may also be provided. This allows the length of the posts 27 to be independently adjusted to allow compensation for irregularities in the floor of the intended mounting surface.

Figure 5:
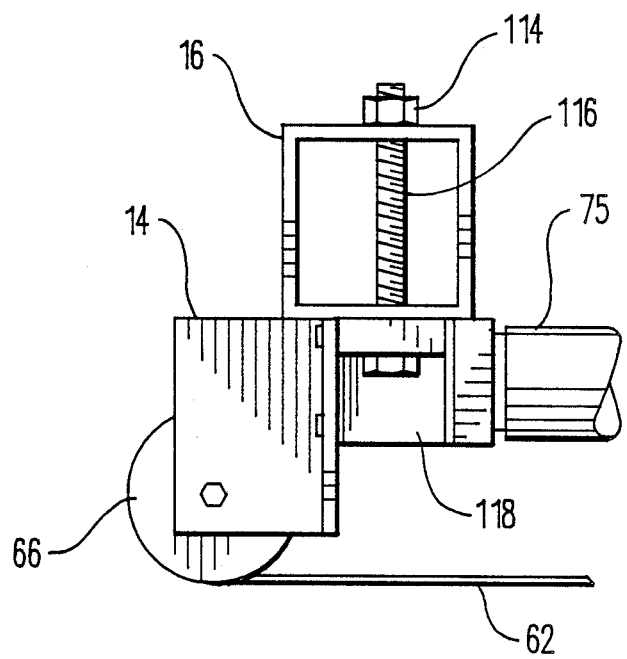
FIG. 5 is a detail view illustrating the mounting of the longitudinal carriage movement cylinder.

FIG. 5 illustrates a detail view of the mounting of the longitudinal movement cylinder 75. A bracket 118 is secured by a bolt 116 extending through the transverse beam 16 and secured by a nut 114. An end bracket 14 is secured to the end face of the bracket 118 and rotatably supports a pulley 66. The cable 62 of the rodless pneumatic cylinder 75 is supported by the pulley 66.

Figure 6:
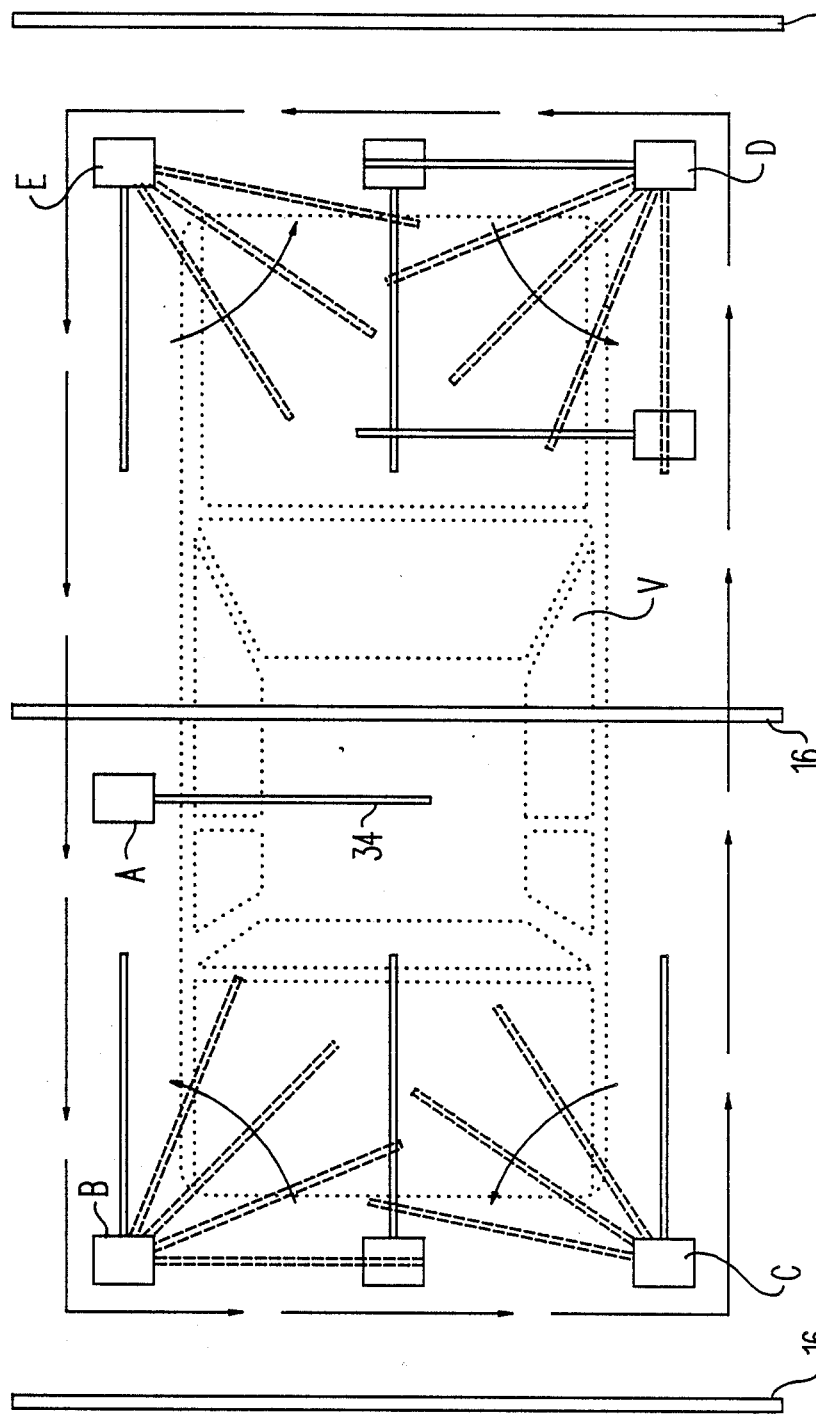
FIG. 6 is a diagrammatic top plan view illustrating the manner of operation of the car wash.

With reference now to FIGS. 1 and 6, the manner of operation of the car wash of the present invention will now be described. A vehicle to be washed V is driven into position beneath the transverse beams 16 and between the spaced vertical posts. The spray head is initially disposed in position A illustrated in FIG. 6. The horizontal portion 34 of the L-shaped spray head extends across the top of the vehicle V. The air cylinder 75 is then actuated to move the carriage assembly 44, 48 along the spaced longitudinal guide rails 40 and 50. Upon reaching the position B, the sensor 56 on the support arm 42 will come into alignment with the cooperating sensor element on the support arm 28. When the sensors 56 see "daylight" across the end of the car, the cylinder 75 will continue to move the carriage assembly 44, 48 a small additional distance determined by the separation of the sensors 56 and 57. When the sensing elements 57 on the arms 42 and 28 come into alignment, the spray nozzles 38 and 36 will be positioned at an optimal distance from the surface of the vehicle V. At this point, the cylinder 75 will be deactivated and the transverse movement cylinder will be activated to move the trolley 60 along the guide rail 64 across the end of the vehicle V. Simultaneously, at the corner position of the car, the rotary indexing mechanism of the spray head 32, 34 will be activated to rotate the spray head through a ninety degree angular increment as illustrated. The transverse movement cylinder will continue to move the trolley 60 along the guide rail 64 until the sensor element 58 on the vertical spray arm portion 32 comes into alignment with the sensor element 54 on the post 23. It should be noted that the sensor beam of the elements 54 and 58 has a sufficiently wide angle to be detected as soon as the spray head arm 32 clears the end of the vehicle V. At this point, the spray head has moved to position C illustrated in FIG. 6, and the spray head indexing mechanism is again activated to rotate the spray head through an additional ninety degree increment as indicated. At this time, the longitudinal movement cylinder 75 is again activated to move the carriage assembly 44 and 48 in the reverse direction, thus moving the spray head back down the opposite side of the vehicle V. When the spray head reaches the position indicated in D, the photo-electric sensing elements 57 and subsequently 56 will again be actuated and the spray head indexing mechanism will rotate the spray head through an additional ninety degree angular increment as illustrated. Simultaneously, the longitudinal movement cylinder 75 will be deactuated and the transverse movement cYlinder will move the trolley 60 back across the guide rail 64. When the spray head reaches the position E, the sensor 58 on the vertical spray head portion 32 will again come into alignment with a cooperating sensor element secured to one of the vertical posts and the spray head indexing mechanism will rotate the spray head through an additional ninety degree angular increment as illustrated. The longitudinal movement cylinder 75 will again be actuated to return the spray head to the starting position A. Thus, the spray head is rotated through a complete three hundred and sixty degree circle during one complete path around the vehicle V. The optimal spacing between the spray nozzles 38 on the vertical spray head portion 32 may be adjusted by varying the spacing between the sensor elements 56 and 57 on the arms 42 and 28. The transverse arm mounting the sensor 58 on the vertical spray head portion 32 may be similarly varied. While infra-red photo-electric sensors are preferred, it should be noted that other conventional forms of non-contact type sensors may be utilized, such as sonar proximity sensors and inductive type proximity sensors, without departing from the scope of the present invention.

Figure 7:
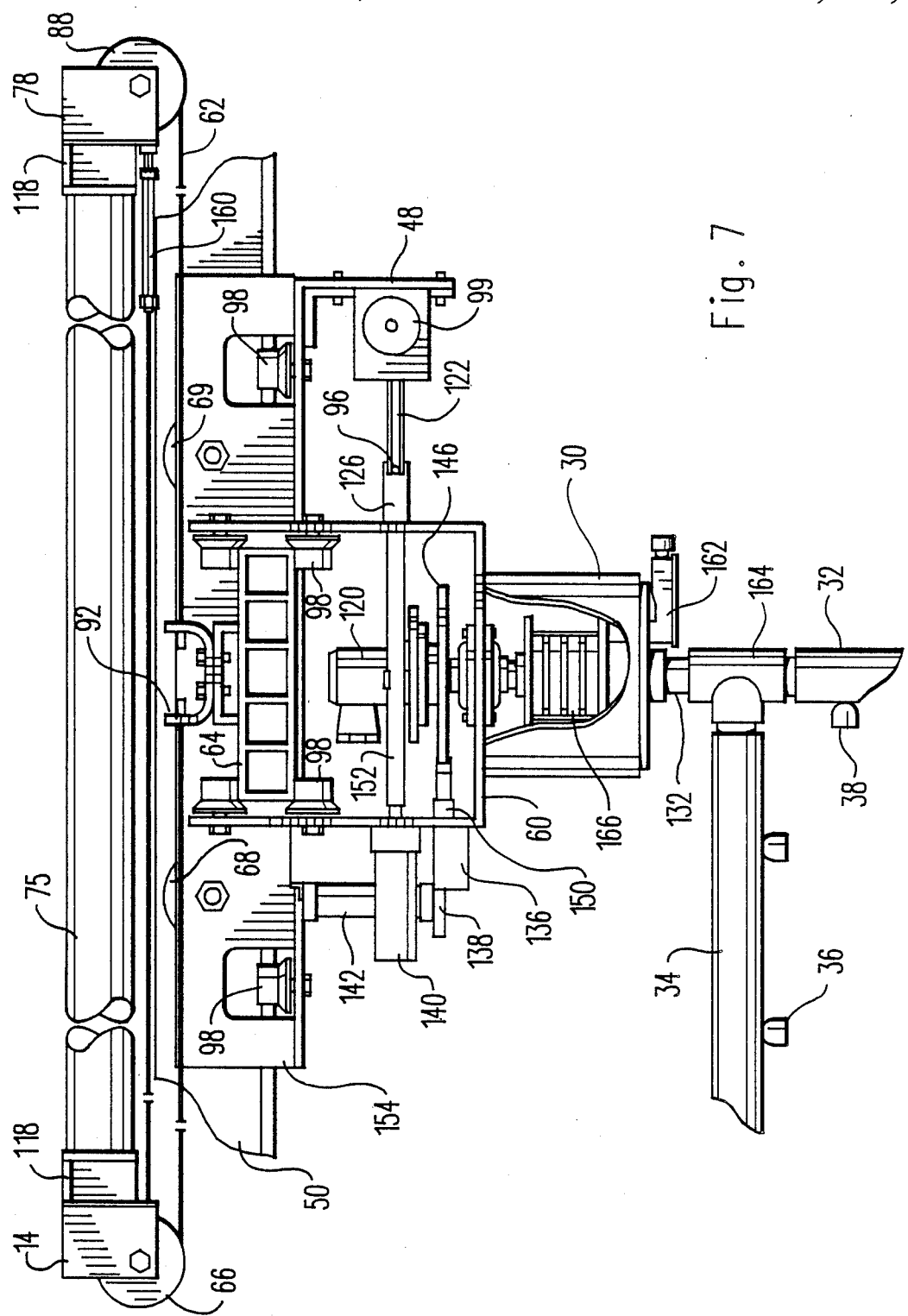
FIG. 7 is a detail view, partially cut away, illustrating the construction of the spray head movement trolley and rotational indexing mechanism.

FIG. 7 is a detail view, partially cut away, which illustrates the construction of the carriage assembly and spray head indexing mechanism. The longitudinal movement cylinder 75 is secured between end brackets 118 and includes a cable 62 supported at a first end by a pulley 66 mounted by a bracket 14 and at an opposite end by a pulley 88 mounted by a bracket 78. The cable 62 includes a cable tensioner 160 to maintain a constant cable tension. The longitudinal movement carriage includes a side frame member 154 having a first pair of rollers 68 and 69 mounted for rotation about a horizontal axis. The roller 68 and 69 are received within the longitudinal guide channel formed in the guide rail member 50. A second pair of rollers 98 are mounted for rotation about a vertical axes on the carriage frame member 154. The rollers 98 abut a vertical edge surface of the rectangular channel shaped guide rail 50 and serve to maintain proper alignment of the carriage assembly therewith. The transverse guide rail 64 has a first end rigidly secured to the frame member 154. The trolley housing 60 includes a plurality of flanged rollers 98 mounted for rotation about horizontal axes. The rollers 98 are positioned in pairs on opposite faces of the guide rail 64. Opposite ends of the cable 62 are secured to the guide rail 64 by a bracket 92. Thus, upon actuation of the cylinder 75, the trolley housing 60 and carriage 154 will be moved along the guide rail 50. A transverse movement cylinder 99 is secured between the side frame rails 154 of the longitudinal movement carriage and to the carriage frame member 48. The transverse movement cYlinder 99 is similarly constructed as described with respect to the longitudinal movement cylinder 75 and includes a cable 96 having opposite ends secured to a vertical side wall of the trolley housing 60 by a bracket 126. The cable 96 is guided by a pair of spaced pulleys, one of which 122 is illustrated. Thus, upon activation of the transverse movement cylinder 99, the trolley housing 60 will be moved transversely along the guide rail 64. As described previously, the spray head includes an L-shaped arm having a horizontal portion 34 and a vertical portion 32. The horizontal portion 34 includes a plurality of spaced nozzles 36 and the vertical portion 32 includes a plurality of similar spaced nozzles 38. The horizontal portion 34 and vertical portion 32 are secured in fluid communication with a hollow mounting shaft 132 by a T fitting 164. The shaft 132 is mounted for rotation relative to a stationary cylindrical housing 30 by conventional bearings and extends centrally through the circular end face thereof. Electrical wiring extends through a sealed interior conduit provided in the hollow shaft 132 and connects with the sensor element 58 illustrated in FIG. 1. The electrical wiring extending through the rotary shaft 132 is connected to a stationary electrical connector 162 through a slip ring assembly 166. The cylindrical housing 30 is secured to a bottom end face of the trolley housing 60. The rotary shaft 132 extends through the bottom face of the housing 60 into the open sided interior thereof. The shaft 132 has an upper end portion terminating in a swivel fluid connector 120 which includes a hose fitting for connection to a conventional source of water, cleaning solvent, and wax fluid distribution system. Thus, the desired fluid is transmitted through the connector 120, through the interior of the hollow shaft 132, to the spray arm portions 34, 32, subsequently through the nozzles 36, 38, and is sprayed upon the exterior surface of a vehicle being washed. A hydraulic cylinder 140 is secured to a side wall of the housing 60 and is operative to axially reciprocate a rotary index actuating shaft 152. The reciprocal indexing arm 152 is operative, in a manner to be subsequently illustrated and described, to rotate the shaft 132 and attached spray head 32, 34 in ninety degree angular increments. A reservoir 142 is in fluid communication with the cylinder 140 and allows the pressure supply to the cylinder 140 to be adjusted through the use of a suitable valve. An additional hydraulic cylinder 138 is secured by a mounting block 136 to the housing 60 and includes a linear output shaft 150 having a locking pin for engagement with one of four notches spaced evenly around the periphery of an indexing position lock wheel 146.

Figure 8:
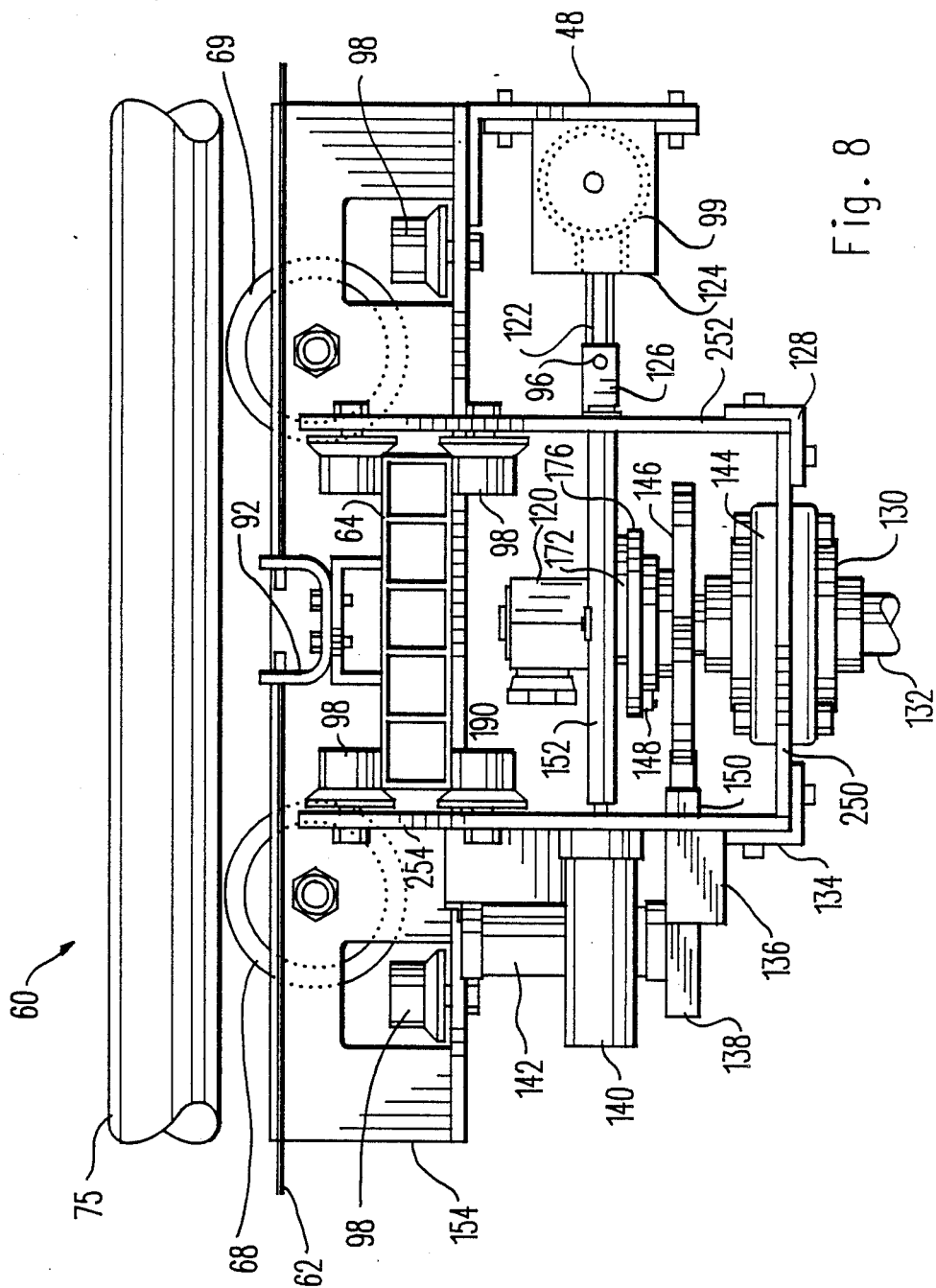
FIG. 8 is an enlarged detail view, illustrating the construction of the spray head rotary indexing mechanism.

FIG. 8 provides a similar enlarged detail view, which illustrates a ratchet cam wheel 190 which is keyed for rotation with the shaft 132. A pawl 148 is secured to the bottom surface of a circular drive wheel 176 for engagement with the ratchet wheel 190. The circular drive wheel 176 is journaled for free rotation with respect to the shaft 132 and is connected by a pivot arm 172 to the index actuating rod 152. Upon actuation of the cylinder 140, the rod 152 moves axially causing the pivot arm 172 to rotate the circular drive wheel 176 and the attached pawl 148. The engagement of the pawl 148 with the ratchet cam indexing wheel 190 causes the shaft 132 to be rotated through a ninety degree angular increment. The ratchet wheel 190 and brake index position locking wheel 146 are both keyed for rotation with the shaft 132. The index position locking brake cylinder 138 is operative to move an index locking pin 150 into and out of engagement with the position locking wheel 146 to secure the shaft 132 in an indexed position, and to release the shaft prior to indexing. The shaft 132 is mounted for rotation with respect to the bottom surface 250 of the trolley housing by conventional bearings 130 and 144. The trolley housing includes spaced parallel side wall members 252 and 254 secured to a transverse floor member 250 by right angle brackets 128 and 134.

Figure 9:
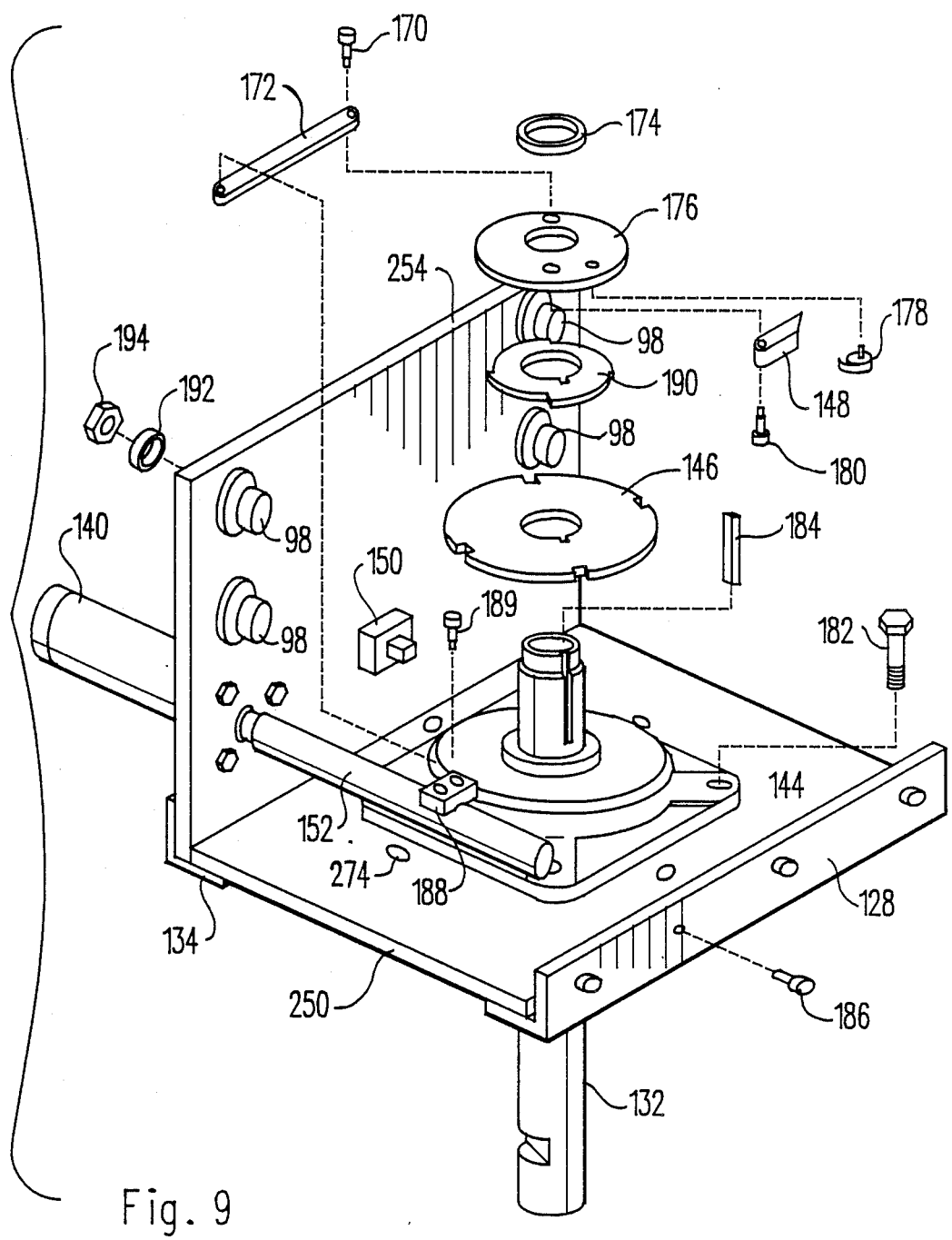
FIG. 9 is an exploded perspective view illustrating the construction of the spray head rotary indexing mechanism.

FIG. 9 is an exploded perspective view which illustrates the assembly of the various components of the rotary indexing mechanism for the shaft 132. The trolley housing includes a planar interior floor member 250 which is secured between a pair of parallel side members 254 and 252 by right angle brackets 134 and 128. The side member 252 (FIG. 8) has been removed for clarity of illustration. A plurality of conventional machine screws 186 may be utilized to secure these elements. The inner bearing assembly 144 is secured to the floor member 250 by a plurality of conventional screws 182. The index actuating bar 152 is secured to the piston rod of the actuating cylinder 140. A mounting block 188 is secured on the indexing bar 152 and an elongated pivot arm 172 has a first end pivotally connected to the mounting block 188 by a pivot mounting screw 189. The pivot mounting screw 189 includes a lower small diameter threaded portion and a larger diameter intermediate smooth bearing portion adapted to be received through the aperture formed at one end of the pivot arm 172. The opposite end of the pivot arm 172 is pivotally secured to upper surface of the circular drive wheel 176 by a pivot screw 170. The shaft 132 receives the brake index position locking wheel 146 and the ratchet cam rotary indexing wheel 190. These elements are secured for rotation with the shaft 132 by a key 184. The circular drive wheel 176 is received for free rotation on the shaft 132 and retained against axial movement by a locking collar 174. The locking collar 174 may include a plurality of spaced set screws for securing the collar 174 to the shaft 132. Alternatively, a suitable groove may be provided in the shaft 132 and the locking collar 174 may take the form of a conventional snap type retaining ring. A pawl 148 is secured to the bottom surface of the circular drive ring 176 by a pivot screw 180. A torsional spring 178 is also secured to the bottom surface of the wheel 176 and serves to bias the pivotal pawl 148 into engagement with the periphery of the ratchet wheel 190. The ratchet wheel 190 is provided with four increasing diameter step cam surfaces, each separated by a ninety degree stepped abutment wall. Upon reciprocation of the indexing bar 152, the pivotal link 172 causes the drive wheel 176 to rotate and the attached pawl 148 to engage the ratchet indexing wheel 190. This causes the shaft 132 to rotate through a ninety degree angular increment. The index position locking brake wheel 146 is provided with four peripheral square notches spaced at ninety degree angular intervals, in alignment with the vertical abutment surfaces of the indexing wheel 190. The index position locking pin 150 has a distal end portion dimensioned for engagement with the notches of the index position locking wheel 146. The locking pin 150 is moved out of engagement with the position locking wheel 146 by the cylinder 138 illustrated in FIG. 8 prior to actuation of the indexing bar 152. Upon completion of the indexing rotation, the pin 150 is moved into engagement with the locking wheel 146, thus securing the shaft 132 in the indexed position. The rollers 98 which support the trolley for movement along the guide rail 64 (FIG. 8) are secured by fastening elements 192 and 194.

Figure 10:
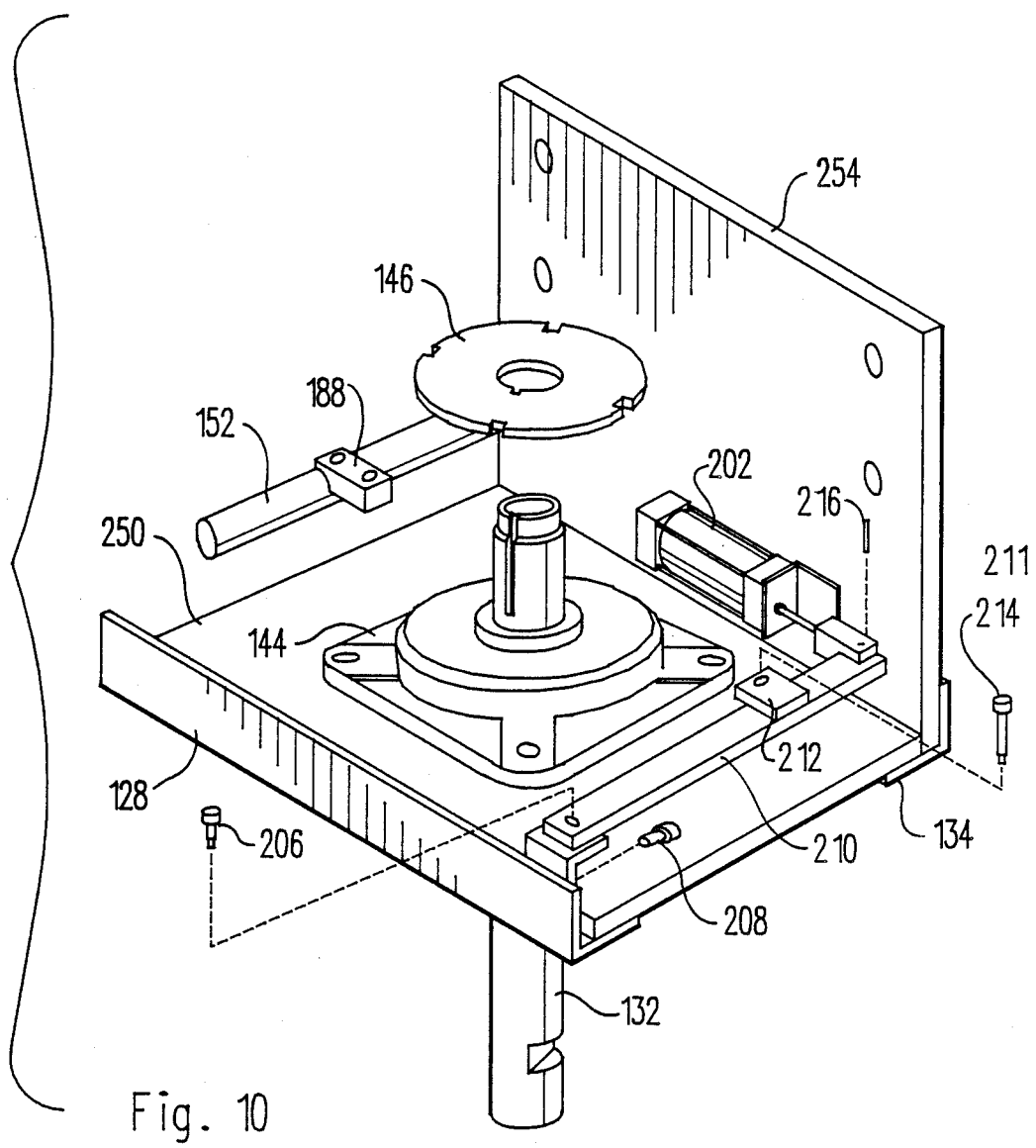
FIG. 10 is an exploded perspective view, illustrating the construction of an alternative spray head rotary indexing position locking mechanism.

FIG. 10 illustrates an alternative mechanism for locking the shaft 132 in a rotational indexed position. A right angle bracket 209 is secured by a screw 208 to the channel member 128. An elongated actuating arm 210 has a first end secured to the bracket 209 by a pivot screw 206. An opposite end of the actuating arm 210 is secured to a bifurcated yoke portion 211 by a pin 216. The yoke portion 211 is connected to the piston rod of an actuating cylinder 202. An index pin 214 is secured to a mounting block 212 on the arm 210. Upon actuation of the cylinder 202, the arm 210 will pivot about the axis of the pivot screw 206 and the locking pin 214 will be moved transversely into and out of engagement with the peripheral notches formed on the index position locking brake wheel 146. The brake wheel 146 is keyed to the shaft 132 and thus the shaft 132 will be locked in the selected indexed position. The remaining components of the rotational indexing mechanism remain as illustrated in FIG. 9.

Figure 11:
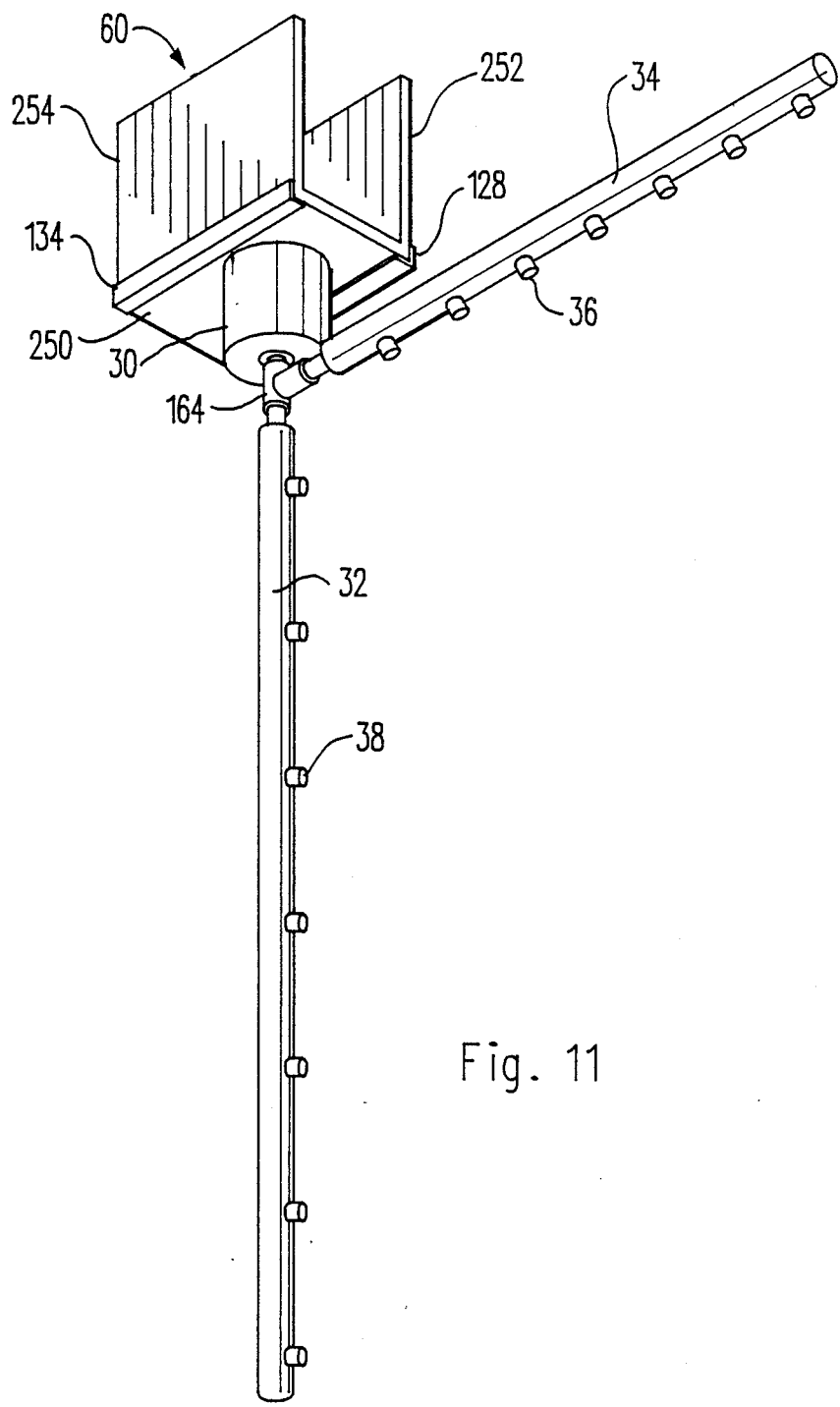
FIG. 11 is a perspective view illustrating the spray head construction.

FIG. 11 provides a perspective view which illustrates the trolley housing 60 and the attached L-shaped rotational indexing spray head.

Figure 12:
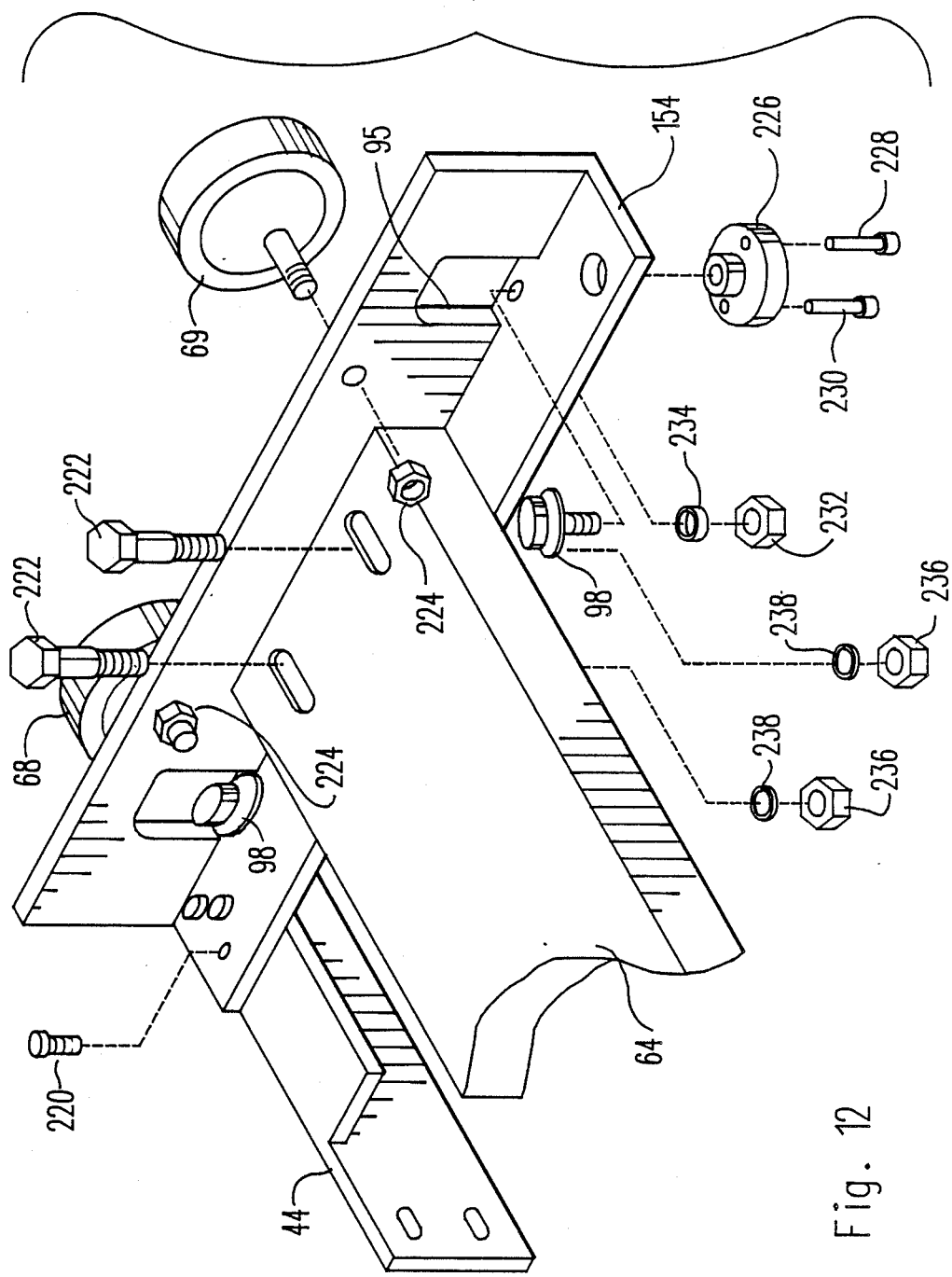
FIG. 12 is an exploded perspective view illustrating the traverse carriage assembly.
Figure 12A:
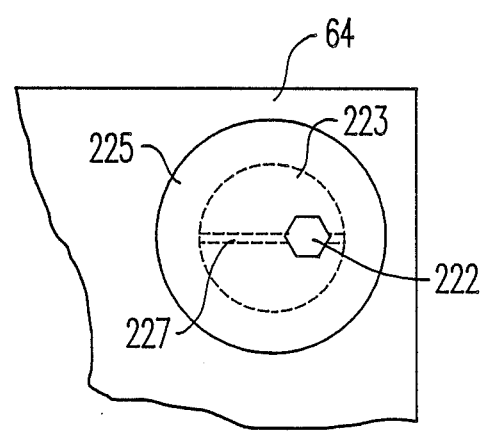
FIG. 12(a) is a detail view illustrating an alternative eccentric transverse guide rail mounting adjustment mechanism.

FIG. 12 is an exploded perspective view which illustrates the constructional details of the longitudinally movable carriage assembly. The carriage assembly includes perpendicularly connected longitudinal 154 and transverse 44 right angle frame members connected by a plurality of threaded fasteners 220. The transverse guide rail 64 has an end portion secured to the longitudinal frame member 154 by bolts 222 and cooperating lock washers 238 and nuts 236. The end portion of the guide rail 64 may be slotted to allow alignment adjustment during assembly. Alternatively, as shown in FIG. 12(a), the bolts 222 may each extend longitudinally through an offset axis of a cylindrical sleeve 223 which is received in a slip fit engagement in a cylindrical bore formed through the guide rail 64, in place of the illustrated slots of FIG. 12. The bolt 222 is secured against rotation and axial movement with respect to the sleeve 223 by a plurality of axially spaced roll pins 227. A radially enlarged flange 225 is formed at an upper end of the sleeve 223 for abutment with the top surface of the guide rail 64. The threaded end of the bolt 222 extends through the bottom of the sleeve 223 and through a circular hole in the frame member 154 for engagement with a conventional nut. By tightening this nut, the guide rail 64 will be clamped in an adjusted position. Rotation of the sleeve 223 prior to tightening this nut allows an eccentric type adjustment. A pair of rollers 68 and 69 have stationary threaded mounting shafts secured to the vertical leg portion of the longitudinal carriage frame member 154 by nuts 224. The rollers 68 and 69 support the carriage for longitudinal reciprocal movement along the guide channel 50, as illustrated in FIG. 7. A pair of rollers 98 are secured within slots 95 formed through the vertical leg portion of the frame member 154 by spacing washers 234 and nuts 232. As illustrated in FIG. 7, the rollers 98 engage the vertical edge surface of the rectangular channel shaped guide channel 50, thus serving to maintain the longitudinal carriage frame member in aligned relation with the guide channel 50. A supporting bracket 226 for a water and cleaning fluid supply conduit is secured to the horizontal leg portion of the frame member 154 by a pair of threaded fasteners 228 and 230. The bracket 226 includes a central bore for receiving a flexible fluid supply hose. A suitable flexible supply hose is received through the bracket 226 and is connected to the swivel fluid connector 120 illustrated in FIG. 7 which feeds water and other cleaning fluids to the spray arms 32 and 34 through the shaft 132.

Figure 13:
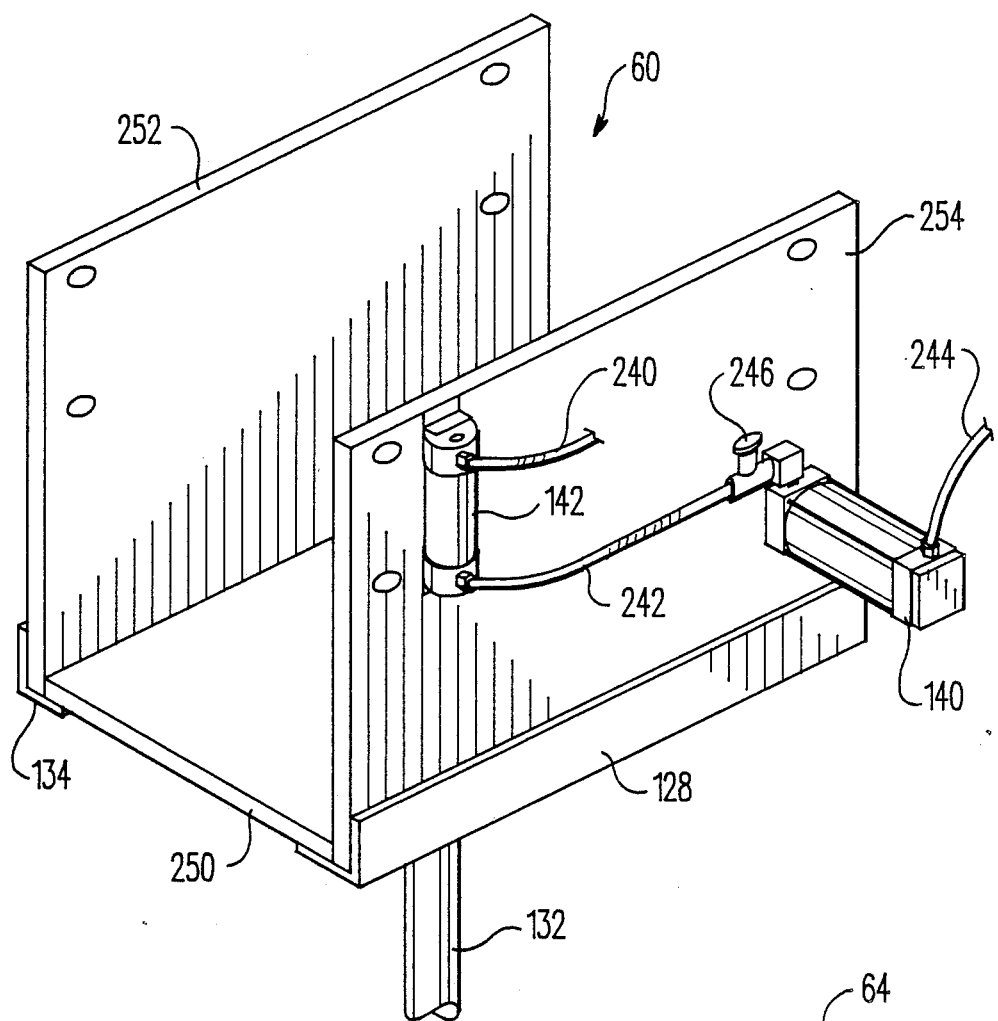
FIG. 13 is a perspective detail view illustrating the spray head supporting trolley and the hydraulic indexing and locking cylinders.

FIG. 13 is a perspective detail view which illustrates the rotary indexing arm actuating cylinder 140 and pressure reservoir 142 mounted on the side wall 254 of the trolley housing. A line 240 supplies hydraulic fluid under pressure to the reservoir 142 and a line 242 is connected to the cylinder 140. By adjusting a manual valve 246, the fluid pressure supplied to the cylinder 140 may be adjusted, thus controlling the rotational indexing speed of the shaft 132. The hydraulic cylinder 140 is of the double acting type and includes a fluid conduit 244 connected to the cylinder 140 on an opposite side of the enclosed piston from the line 242.

Figure 14:
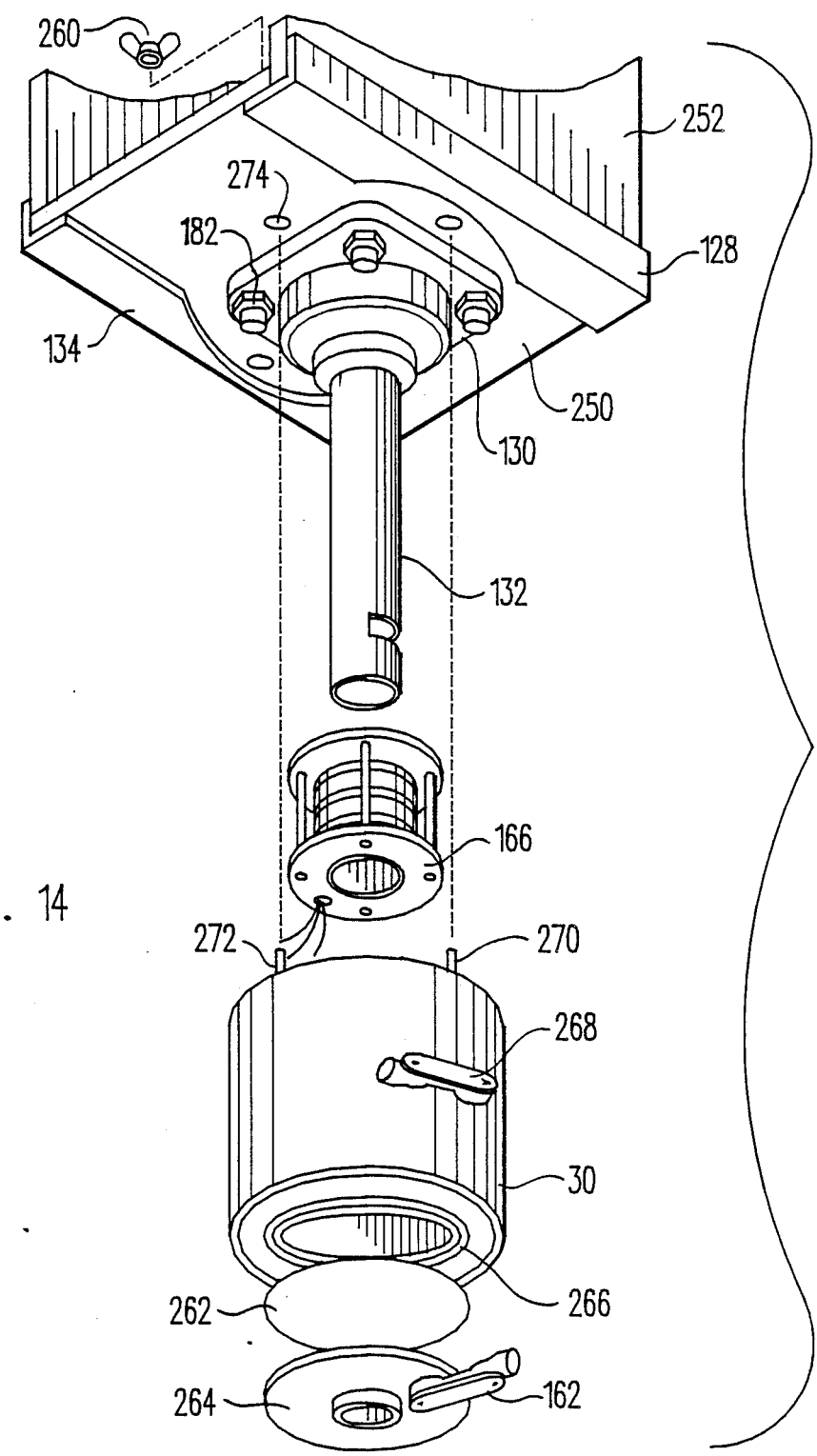
FIG. 14 is an exploded perspective view illustrating the rotarY spray head electrical connecting assembly.

FIG. 14 is an exploded perspective view which illustrates the electrical connector assembly disposed on the shaft 132 and including a cylinder housing 30 mounted on the exterior bottom surface 250 of the trolley housing by engagement of mounting studs 270 and 272 through a plurality of spaced apertures 274 and secured by nuts 260. A conventional type of slip ring connector 166 has a rotational body portion mounted for rotation with the shaft 132 and includes a plurality of electrical contacts connected by electrical wiring through the vertical spray arm portion 32 (FIG. 1) to the sensor 58. Stationary contact brush portions of the slip ring assembly 166 are connected to a stationary connector 162 which is secured to a water tight retaining plate 264. A suitable seal 262 is provided to prevent spray from entering the housing 30. An additional form of electrical splice connector 268 may be provided through a side wall portion of the housing 30.

Figure 15:
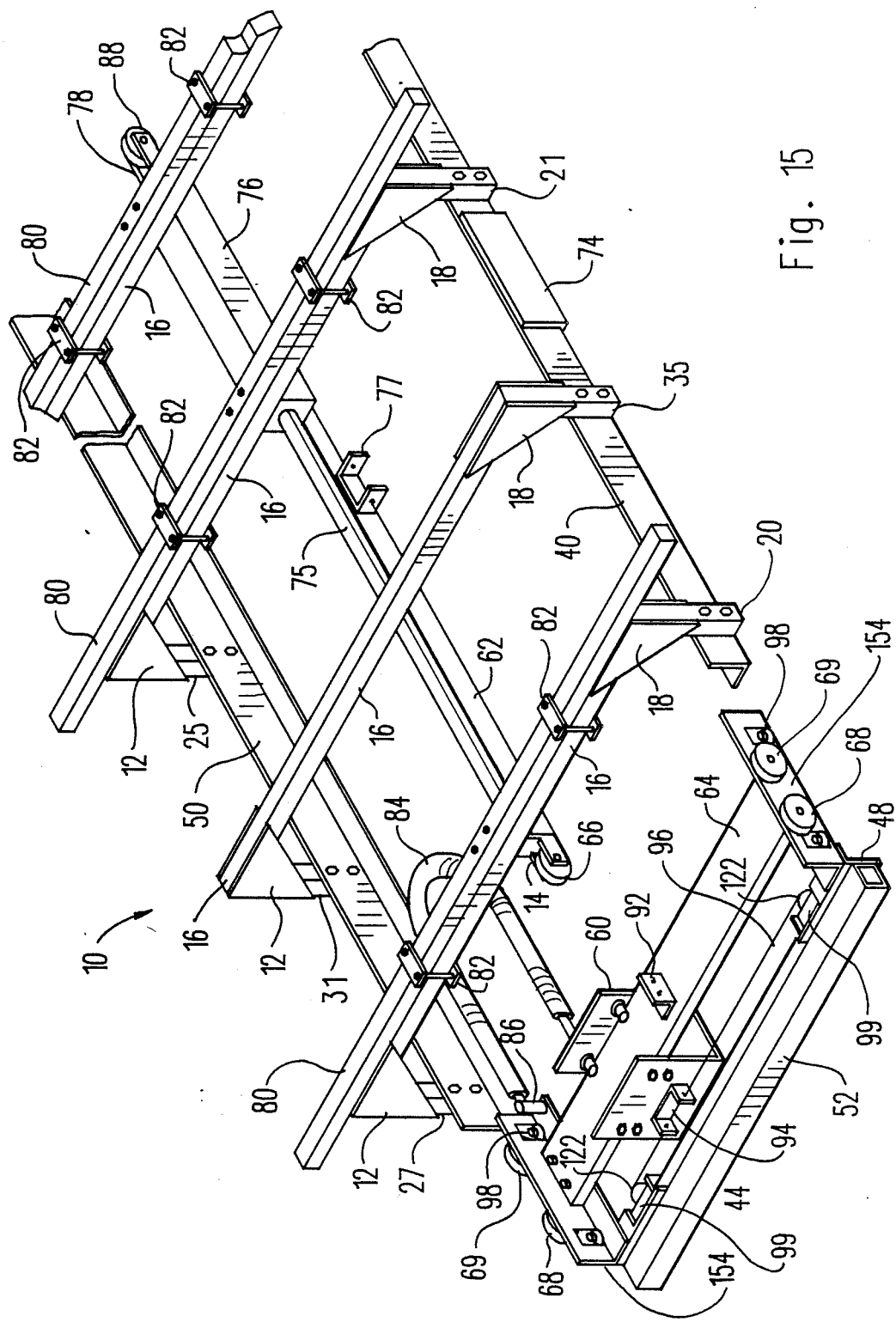
FIG. 15 is a perspective detail view illustrating the spray head movement carriage.

FIG. 15 provides a perspective view which illustrates the details of the transverse carriage mounting assembly. The reciprocal trolley housing 60 is received for transverse movement along the transverse guide rail 64 and is actuated for transverse movement by the cable cylinder 99 which includes a cable 96 supported by a pair of spaced pulleys 122 and connected through a bracket 94 to a side wall of the trolley housing 60. The longitudinal movement cylinder 75, 76 includes a cable 62 connected by brackets 77 and 92 to the top surface of the transverse guide rail 64. Thus, the transverse guide rail and spaced longitudinal carriage frame members 154 are mounted for movement along the longitudinal guide channels 50 and 40. Rollers 68 and 69 and positioning rollers 98 retain the carriage assembly in proper alignment for low friction motion along the longitudinal channel members 40 and 50. A flexible tubing 84 is mounted by a coupling 86 through a bracket 226 (FIG. 12) to a conventional cleaning fluid distribution system. The opposite end of the flexible conduit 84 is connected through the housing 60 to the swivel fluid coupling 120 (FIG. 7). Suitable reinforcement beams 80 are utilized in conjunction with brackets 82 to secure the longitudinal movement cable cylinder 75, 76 between the spaced transverse beams 16. As may now be understood, through suitable actuation of the longitudinal movement cylinder mechanisms 75, 76 and the horizontal movement cylinder 99, the trolley housing 60 may be caused to move in two perpendicular directions. It should be noted that both the cylinders 75, and 99 are of the double acting type and thus may be selectively actuated to move the trolley housing 60 reciprocally in both perpendicular directions.

Figure 16:
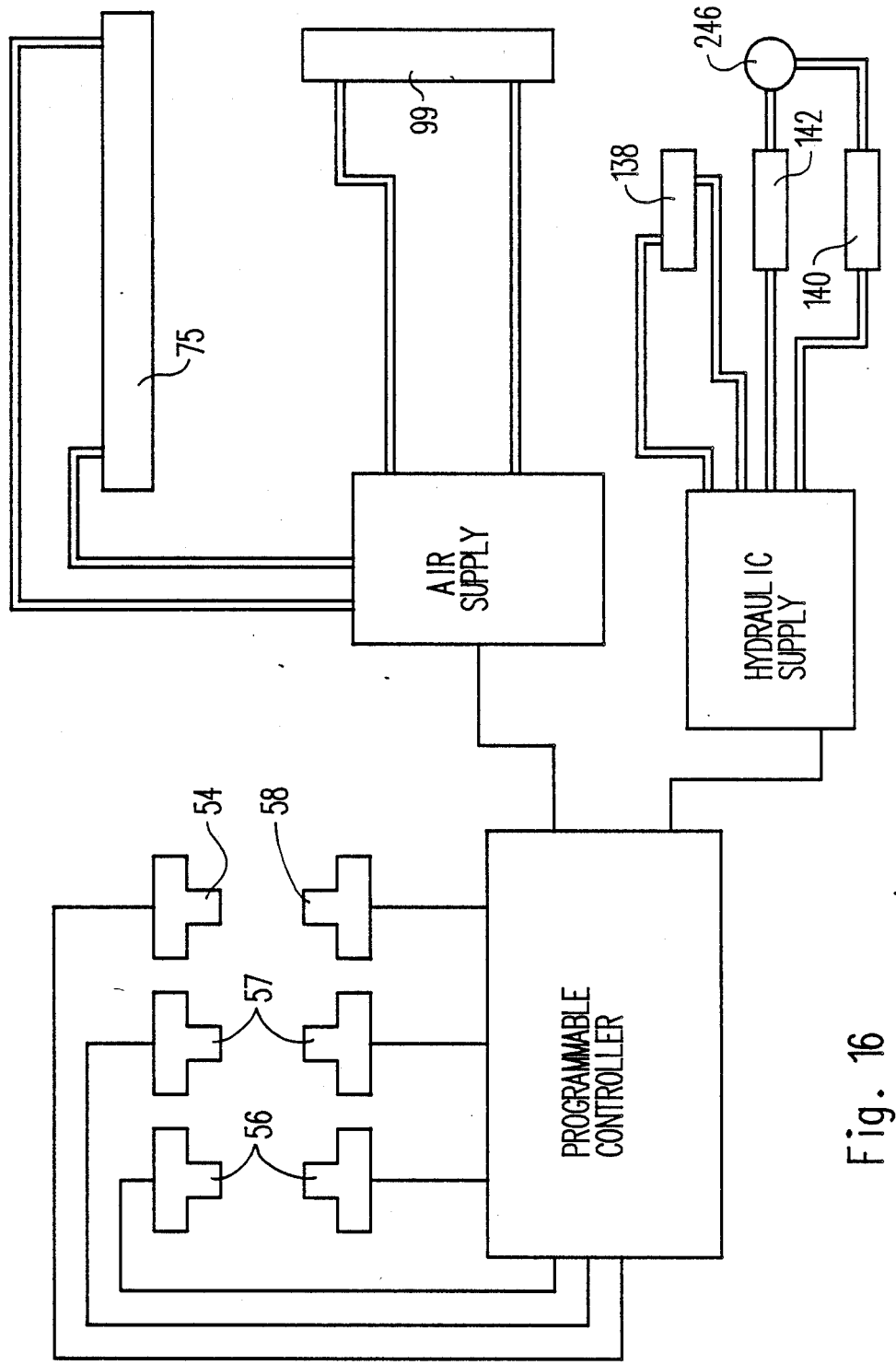
FIG. 16 is a block diagram illustrating the control system of the car wash.

FIG. 16 is a block diagram illustrating the control system of the car wash of the present invention. The signals from the cooperating pairs of infra-red photoelectric sensors 56, 57, 54 and 58 are transmitted to an electronic programmable controller. Output signals from the programmable controller are fed to an air supply unit and a hydraulic supply unit. Each of the air supply and hydraulic supply units include electrically actuated valves and an internal pump or compressor as well as a pressure storage reservoir. Upon suitable activation by the programmable controller, the air supply system is operative to suitably actuate the double acting pneumatic cable cylinder 75 for inducing longitudinal movement of the carriage assembly or activation of the transverse pneumatic cable cylinder 99 for causing transverse movement of the trolley mechanism. The hydraulic supply system is activated to control the double acting index position locking cylinder 138 as well as the double acting rotary indexing cylinder 140. The indexing cylinder 140 has a rate of reciprocation controlled by a valve 246 acting upon the output line of a reservoir 142. The particular arrangement of the various conventional electrically actuated hydraulic and pneumatic valves required for controlling the fluid flows is considered obvious to engineers of ordinary skill in the art having the benefit of the foregoing description, and this plumbing arrangement may take a variety of different forms without departing from the scope of the invention. It should be noted that the present invention allows the programmable controller, the air supply and the hydraulic supply systems to all be mounted in a remote location, protected from the wash spray and chemicals. The only electrical power required in the washing area is a 24 VAC supply to the various photo-sensors, and thus the potential of electrocution is obviated.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. An improved car wash, comprising:
a spray head;
means for automatically indexing said spray head through approximately ninety degree angular increments at each corner of a vehicle being washed;
carriage means mounting said spray head for movement in two perpendicular directions;
means for moving said carriage means in said two perpendicular directions;
non-contacting sensor means for sensing length and width dimensions of a vehicle to be washed; and
control means responsive to said sensor means for activating said moving means to move said carriage means around a vehicle.

2. The improved car wash of claim 1, wherein said control means includes means for maintaining a predetermined constant spacing between said spray head and a vehicle.

3. The improved car wash of claim 1, wherein said sensor means comprises photo-electric sensing means.

4. The improved car wash of claim 1, wherein said moving means comprises pneumatic cylinder means.

5. The improved car wash of claim 1, wherein said spray head comprises an L-shaped arm having a horizontal portion for washing top surfaces of a vehicle and a vertical portion for washing side surfaces of a vehicle.

6. The improved car wash of claim 1, further comprising:
a hollow rotary shaft connected to and in fluid communication with said spray head;
a ratchet wheel secured for rotation with said shaft;
a reciprocal arm;
a pawl adjacent to and in operative association with said ratchet wheel;
means connecting said arm to said pawl; and
means for reciprocating said arm.

7. The improved car wash of claim 6, further comprising:
a rotary drive wheel received for free rotation on said shaft, said drive wheel overlying said ratchet wheel, said pawl pivotally mounted on a bottom surface of said drive wheel; and
a pivotal link having a first end pivotally connected to said arm and a second end pivotally connected to said drive wheel.

8. The improved car wash of claim 6, further comprising means for locking said shaft in an indexed position.

9. The improved car wash of claim 8, further comprising an index position lock wheel secured for rotation with said shaft;
a plurality of notches spaced about a periphery of said lock wheels; and
a locking pin mounted for movement into and out of engagement with one of said notches.

10. The improved car wash of claim 9, further comprising a hydraulic cylinder for reciprocating said locking pin.

11. The improved car wash of claim 9, further comprising a pivotal arm secured to said pin and a hydraulic cylinder operatively connected for pivoting said arm.

12. The improved car wash of claim 1, further comprising a hollow rotary shaft connected to and in fluid communication with said spray head and a swivel fluid connector on said shaft for supplying cleaning fluids to said spray head.

13. The improved car wash of claim 12, further comprising a sensor mounted on said spray head.

14. The improved car wash of claim 13, further comprising electrical wiring extending through said hollow shaft to said sensor and connected to a stationary electrical connector adjacent an upper portion of said shaft through a slip ring rotary contact assembly.

15. An improved car wash, comprising:
a L-shaped spray head having a horizontal portion for washing top surfaces of a vehicle and a vertical portion for washing side surfaces of a vehicle;
carriage means mounting said spray head for movement in two perpendicular directions;
means for moving said carriage means in said two perpendicular directions;
non-contacting sensor means for sensing length and width dimensions of a vehicle to be washed;
control means responsive to said sensor means for activating said moving means to move said carriage means around a vehicle;
a hollow rotary shaft connected to and in fluid communication with said spray head; and
means for automatically rotating said shaft through approximately ninety degree angular increments in response to detection of a vehicle corner by said non-contacting sensor means.

16. An improved car wash, comprising:
a spray head having a generally horizontal portion for washing top surfaces of a vehicle and a generally vertical portion for washing side surfaces of a vehicle;
moving means for independently moving said spray head in perpendicular longitudinal and transverse directions;
sensor means for sensing length and width dimensions of a vehicle to be washed;
control means responsive to said sensor means for activating said moving means to move said spray head in a closed rectangular path around a vehicle while maintaining a constant predetermined spacing between said spray head and a vehicle; and
means activated by said control means for automatically indexing said spray head through a predetermined angular increment at each sensed corner of a vehicle being washed.

17. The improved car wash of claim 16, further comprising:
a hollow rotary shaft connected to and in fluid communication with said spray head;
a ratchet wheel secured for rotation with said shaft;
a reciprocal arm;
a pawl adjacent to and in operative association with said ratchet wheel;
means connecting said arm to said pawl; and
means for reciprocating said arm.

18. The improved car wash of claim 17, further comprising:
a rotary drive wheel received for free rotation on said shaft, said drive wheel overlying said ratchet wheel, said pawl pivotally mounted on a bottom surface of said drive wheel; and
a pivotal link having a first end pivotally connectd to said arm and a second end pivotally connected to said drive wheel.

19. The improved car wash of claim 19, further comprising means for locking said shaft in an indexed position.

20. A method for washing a vehicle, comprising the steps of:
(1) providing:
a spray head having a horizontal portion for washing top surfaces of said vehicle and a vertical portion for washing side surfaces of said vehicle;
a carriage mounting said spray head for independent movement in two perpendicular directions;
means for moving said carriage in said two perpendicular directions;
non-contacting sensor means for sensing length and width dimensions of a vehicle to be washed;
control means responsive to said sensor means for activating said moving means to move said carriage;
(2) moving said spray head around the vehicle and sensing length and width dimensions of vehicle by said sensor means;
(3) activating said control means in response to said sensed dimensions to move said spray head around the vehicle in a closed rectangular path;
(4) applying cleaning fluids through said spray head to the vehicle;
(5) maintaining said spray head at a constant optimal distance from the vehicle; and
(6) indexing said spray arm through approximately a ninety degree angular increment at each corner of the vehicle.

* * * * *